（12） United States Patent
Takaku et al.

(10) Patent No.: US 6,910,085 B2
(45) Date of Patent: Jun. 21, 2005

(54) AUDIO VISUAL SYSTEM HAVING A SERIAL BUS FOR IDENTIFYING DEVICES CONNECTED TO THE EXTERNAL TERMINALS OF AN AMPLIFIER IN THE SYSTEM

(75) Inventors: Yoshiyuki Takaku, Tokyo (JP); Mari Horiguchi, Tokyo (JP)

(73) Assignee: Sony Corporation, Tokyo (JP)

( * ) Notice: Subject to any disclaimer, the term of this patent is extended or adjusted under 35 U.S.C. 154(b) by 346 days.

(21) Appl. No.: 09/824,269

(22) Filed: Apr. 2, 2001

(65) Prior Publication Data

US 2001/0047440 A1 Nov. 29, 2001

(30) Foreign Application Priority Data

Apr. 4, 2000 (JP) .................................... 2000-106718

(51) Int. Cl.$^7$ .......................... G06F 13/38; G06F 13/12
(52) U.S. Cl. ................ 710/62; 710/2; 710/7; 710/8; 710/10; 710/15; 710/20; 713/1; 713/2; 713/100
(58) Field of Search .............................. 710/2, 7, 8, 10, 710/15, 20, 62, 4, 9, 16, 31, 33, 18; 713/1, 2, 100; 711/170; 709/209, 221, 242

(56) References Cited

U.S. PATENT DOCUMENTS

| | | | | |
|---|---|---|---|---|
| 4,998,245 A | * | 3/1991 | Tanaka et al. | 370/432 |
| 5,101,494 A | * | 3/1992 | Bilski et al. | 717/127 |
| 5,446,714 A | * | 8/1995 | Yoshio et al. | 369/47.21 |
| 5,550,999 A | * | 8/1996 | Nagano et al. | 711/115 |
| 5,579,123 A | * | 11/1996 | Sato | 386/96 |
| 5,581,606 A | * | 12/1996 | Gineys | 379/88.23 |
| 5,734,819 A | * | 3/1998 | Lewis | 713/200 |
| 5,887,067 A | * | 3/1999 | Costa et al. | 381/81 |
| 5,918,050 A | * | 6/1999 | Rosenthal et al. | 709/108 |
| 6,009,480 A | * | 12/1999 | Pleso | 710/8 |
| 6,061,751 A | * | 5/2000 | Bruner et al. | 710/74 |
| 6,072,472 A | * | 6/2000 | Shiga | 345/168 |
| 6,134,616 A | * | 10/2000 | Beatty | 710/104 |
| 6,314,479 B1 | * | 11/2001 | Frederick et al. | 710/63 |
| 6,449,715 B1 | * | 9/2002 | Krivoshein | 713/1 |
| 6,457,100 B1 | * | 9/2002 | Ignatowski et al. | 711/119 |
| 6,477,589 B1 | * | 11/2002 | Suzuki et al. | 710/18 |
| 6,480,916 B1 | * | 11/2002 | Shishizuka et al. | 710/107 |
| 6,553,431 B1 | * | 4/2003 | Yamamoto et al. | 710/8 |
| 6,618,750 B1 | * | 9/2003 | Staats | 709/209 |
| 6,735,693 B1 | * | 5/2004 | Hamlin | 713/168 |

FOREIGN PATENT DOCUMENTS

| | | | | | |
|---|---|---|---|---|---|
| GB | 2275800 A | * | 9/1994 | | G08C/23/00 |
| JP | 06175942 A | * | 6/1994 | | G06F/13/00 |
| JP | 06251500 A | * | 9/1994 | | G11B/20/02 |

* cited by examiner

*Primary Examiner*—Jeffrey Gaffin
*Assistant Examiner*—Angel L. Casiano
(74) *Attorney, Agent, or Firm*—Frommer Lawrence & Haug LLP; William S. Frommer; Darren M. Simon

(57) ABSTRACT

An information processing system comprising a computer connected to an amplifier in an audio visual (AV) system through an IEEE 1394 serial bus connection. The amplifier has various different types of external terminals for connecting to other AV devices. The computer requests, receives and displays name information on the external terminals from the amplifier. A user of the system can select various AV devices from the name information displayed on the computer. The computer then commands the amplifier to switch to the selected AV device.

12 Claims, 21 Drawing Sheets

| OFFSET | NAME | OPERATION |
|---|---|---|
| 000h | STATE_CLEAR | CONDITION AND CONTROL INFORMATION |
| 004h | STATE_SET | SET STATE-CLEAR BIT |
| 008h | NODE_IDs | SHOW 16-BIT NODE ID |
| 00Ch | RESET_START | START COMMAND RESET |
| 018h-01Ch | SPLIT_TIMEOUT | MEASURE THE MAXIMUM TIME OF SPLIT |
| 200h | CYCLE_TIME | CYCLE TIME |
| 210h | BUSY_TIMEOUT | DEFINE RETRY CONTROL |
| 21Ch | BUS_MANAGER | SHOW ID OF BUS MANAGER |
| 220h | BANDWIDTH_AVAILABLE | SHOW BANDWIDTH AVAILABLE TO ISOCHRONOUS COMMUNICATIONS |
| 224h-228h | CHANNELS_AVAILABLE | SHOW USAGE CONDITION OF EACH CHANNELPAGE |

FIG. 4

| 400h | 04h | crc_length | rom_crc_value |
|---|---|---|---| bus_info_block

| 404h | "1394" |||
|---|---|---|---|
| 408h | irmc/cmc/isc/bmc reserved | crc_clk_acc | max_rec | reserved |
| 40Ch | Company_ID || Chip_ID_hi |
| 410h | Chip_ID_lo |||

Root_directory

| 414h | root_length | CRC |
|---|---|---|
| 418h | 03h | module_vender_id |
| 41Ch | 0Ch | node_capabilities |
| 420h | 8Dh | node_unique_id offset |
| 428h | D1h | unit_directory offset |
| ⋮ | | |
| | Optional. ||

Unit_directory

| unit_directory_length | CRC |
|---|---|
| 12h | unit_spec_id |
| 13h | unit_sw_version |
| Optional. ||

FIG. 6

| Address | Register |
|---|---|
| 900h | Output Master Plug Register |
| 904h | Output Plug Control Register #0 |
| 908h | Output Plug Control Register #1 |
| ⋮ | ⋮ |
| 97Ch | Output Plug Control Register #30 |
| 980h | Input Master Plug Register |
| 984h | Input Plug Control Register #0 |
| 988h | Input Plug Control Register #1 |
| ⋮ | ⋮ |
| 9FCh | Input Plug Control Register #30 |

FIG. 7

FIG. 8A oMPR

| data rate capacity | broadcast channel base | non-persistent extension field | persistent extension field | reserved | number of output plugs |
|---|---|---|---|---|---|
| 2 | 6 | 6 | 6 | 3 | 5 |

(bit)

FIG. 8B oPCR [n]

| on-line | broadcast connection counter | point-to-point connection counter | reserved | channel number | reserved | data rate | overhead ID | payload |
|---|---|---|---|---|---|---|---|---|
| 1 | 6 | 6 | 2 | 6 | 3 | 2 | 4 | 10 |

(bit)

FIG. 8C iMPR

| data rate capacity | broadcast channel base | non-persistent extension field | persistent extension field | reserved | number of output plugs |
|---|---|---|---|---|---|
| 2 | 6 | 6 | 6 | 3 | 5 |

(bit)

FIG. 8D iPCR [n]

| on-line | broadcast connection counter | point-to-point connection counter | reserved | channel number | reserved |
|---|---|---|---|---|---|
| 1 | 6 | 6 | 2 | 6 | 16 |

(bit)

| The General Subunit Identifier Descriptor ||
|---|---|
| address | contents |
| 00 00₁₆ | descriptor_length |
| 00 01₁₆ | |
| 00 02₁₆ | generation_ID |
| 00 03₁₆ | size_of_list_ID |
| 00 04₁₆ | size_of_object_ID |
| 00 05₁₆ | size_of_object_position |
| 00 06₁₆ | number_of_root_object_lists(n) |
| 00 07₁₆ | |
| 00 08₁₆ | root_object_list_id_0 |
| ⋮ | ⋮ |
| | root_object_list_id_n-1 |
| | subunit_dependent_length |
| | subunit_dependent_information |
| | manufacturer_dependent_length |
| | manufacturer_dependent_information |

FIG. 11

| generation_ID values ||
|---|---|
| generation_ID | meaning |
| 00₁₆ | Data structures and command sets as specified in the AV/C General Specification, version 3.0 |
| all others | reserved for future specification |

FIG. 12

| List ID Value Assignment Ranges ||
|---|---|
| range of values | list definition |
| 0000₁₆–0FFF₁₆ | reserved |
| 1000₁₆–3FFF₁₆ | subunit-type dependent |
| 4000₁₆–FFFF₁₆ | reserved |
| 1 0000₁₆–max list ID value | subunit-type dependent |

FIG. 13

| ctype/response | | |
|---|---|---|
| Command | 0000 | CONTROL |
| | 0001 | STATUS |
| | 0010 | SPECIFIC INQUIRY |
| | 0011 | NOTIFY |
| | 0100 | GENERAL INQUIRY |
| | 0101 ~ 0111 | (reserved for future specification) |
| Response | 1000 | NOT IMPLEMENTED |
| | 1001 | ACCEPTED |
| | 1010 | REJECTED |
| | 1011 | IN TRANSITION |
| | 1100 | IMPLEMENTED/STABLE |
| | 1101 | CHANGED |
| | 1110 | (reserved for future specification) |
| | 1111 | INTERIM |

FIG. 18A

| subunit_type | |
|---|---|
| 00010 | Video monitor |
| ~ | (reserved) |
| 00011 | Disc recorder/Player |
| 00100 | Tape recorder/Player |
| 00101 | Tuner |
| 00111 | Video Camara |
| ~ | (reserved) |
| 11100 | Vendor unique |
| 11101 | reserved |
| 11110 | Subunit type extended to next byte |
| 11111 | Unit |

FIG. 18B

| opcode:Operation Code | |
|---|---|
| 00h | VENDOR-DEPENDENT |
| 50h | SEARCH MODE |
| 51h | TIMECODE |
| 52h | ATN |
| 60h | OPEN MIC |
| 61h | READ MIC |
| 62h | WRITE MIC |
| C1h | LOAD MEDIUM |
| C2h | RECORD |
| C3h | PLAY |
| C4h | WIND |
| ~ | ~ |

FIG. 18C

| AV/C CTS=0000 | control ctypes=0000 | tape recorder/player subunit type=00100 | id=ID0 id=000 | PLAY opcode=C3h | FORWARD operand=75h |

FIG. 19A

| AV/C CTS=0000 | accepted response=1001 | tape recorder/player subunit type=00100 | id=ID0 id=000 | PLAY opcode=C3h | FORWARD operand=75h |

FIG. 19B

AUDIO VISUAL SYSTEM HAVING A SERIAL BUS FOR IDENTIFYING DEVICES CONNECTED TO THE EXTERNAL TERMINALS OF AN AMPLIFIER IN THE SYSTEM

BACKGROUND OF THE INVENTION

1. Field of the Invention

The present invention relates to an information processing device, control device and information processing system and methods thereof, and is suitably applied to such as an audio visual (AV) system which is formed by connecting various AV devices to each other.

2. Description of the Related Art

The institute of electrical electronics engineers (IEEE) has been promoting to standardize the IEEE 1394 high performance serial bus, that is known as high speed serial bus (hereinafter referred to as IEEE 1394 serial bus) and has proposed to construct the AV system as the household network by connecting various AV devices existing in the household in utilizing said IEEE 1394 serial bus.

As such AV system, the system is constructed by such as a personal computer, a mini disk (MD) player, an audio amplifier, a compact disc (CD) player, and a video tape recorder (VTR) has been developed.

As the external terminal to connect to the other AV device, the audio amplifier is equipped with an external terminal for the IEEE1394 serial bus (hereinafter referred to as IEEE1394 terminal) for connecting the MD player to be connected to the personal computer via the IEEE1394 serial bus, an input/output external terminal for the RCA cable for transmitting/receiving analog audio and video signal between VTRs, and an input external terminal for optical cable for transmitting optical digital data to be reproduced from the CD player.

In this case, in the audio amplifier, the identification number to identify said external terminal is assigned to each external terminal, and also the name "VIDEO" is attached to the input/output external terminal for the RCA cable, and "CD" is attached to the input external terminal for optical cable.

Incidentally, in the case where the personal computer obtains the information regarding the external terminal of the audio amplifier, it cannot obtain names attached to external terminals such as input/output external terminals for RCA cable and input/output terminals for optical cable, except the IEEE1394 terminal and can obtain the information only on the identification numbers assigned to said external terminals and the distinction of input/output.

Thus, when the personal computer displays the information on the external terminal of the audio amplifier on the display unit, it can display names of AV devices connected to said IEEE1394 terminal. However, regarding external terminals other than the IEEE1394, it could display the information only on identification numbers and the distinction of input/output of said external terminals. Accordingly, it could not provide sufficient information on external terminals of the audio amplifier to the user.

Accordingly, in the case where the user switches the input external terminal of the audio amplifier by visually confirming the display unit of the personal computer, it caused a problem that the user could not switch the input external terminal unless he should grasp the name of said input external terminal corresponding to the identification number of the input external terminal in advance.

SUMMARY OF THE INVENTION

In view of the foregoing, an object of this invention is to provide an information processing device, control device and an information processing system and methods thereof, which are capable of easily identifying the names of terminals possessed by the information processing device.

The foregoing object and other objects of the invention have been achieved by the provision of an information processing device, control device and an information processing system and methods thereof. By transmitting name data showing the names of each of multiple terminals possessed by the main information processing device to the control device via the predetermined communication means, and by displaying the names of each of terminals that said name data shows on the display means of the control device, the user can easily grasp the name of terminal possessed by the main information processing device.

The nature, principle and utility of the invention will become more apparent from the following detailed description when read in conjunction with the accompanying drawings in which like parts are designated by like reference numerals or characters.

BRIEF DESCRIPTION OF THE DRAWINGS

In the accompanying drawings:

FIG. 4 is a diagram explaining a main CSR offset address, name and operation;

FIG. 6 is a diagram showing bus info block, route directory, and unit directory;

FIG. 7 is a diagram explaining the constitution of PCR;

FIGS. 8A to 8D are diagrams explaining the constitutions of oMPR, oPCR, iMPR, and iPCR;

FIG. 11 is a diagram showing a format of general Subunit Identifier Descriptor;

FIG. 12 is a diagram showing the values of generation ID;

FIG. 13 is a diagram showing the assignment ranges of the list ID;

FIGS. 18A to 18C are diagrams showing an example of an AV/C command;

FIGS. 19A and 19B are diagrams showing examples of the AV/C command and the response;

DETAILED DESCRIPTION OF THE EMBODIMENT

Figure 1:
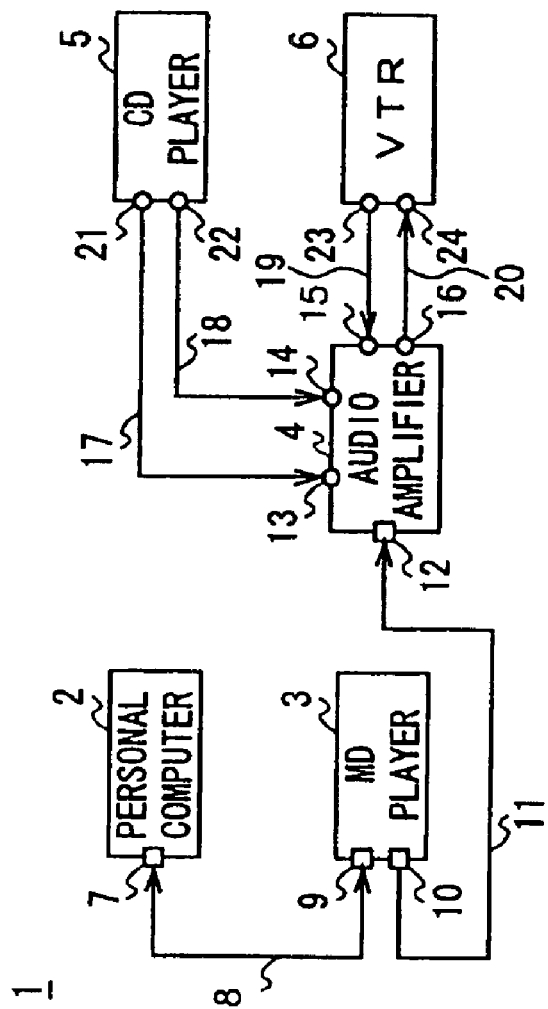
FIG. 1 is a block diagram showing the configuration of one embodiment of the information processing system according to the present invention.

Preferred embodiments of this invention will be described with reference to the accompanying drawings:

In FIG. 1, 1 generally shows the construction of an AV system, and this AV system comprises a personal computer 2 and a mini disk (MD) player 3, an audio amplifier 4, a compact disc (CD) player 5 and a video tape recorder (VTR) 6.

The personal computer 2 comprises an external terminal for the IEEE1394 serial bus (hereinafter referred to as IEEE 1394 terminal) 7 as an external terminal and is connected to the MD player 3 via the IEEE 1394 serial bus 8 as the communication means to be connected to said IEEE 1394 terminal 7.

The MD player 3 comprises IEEE 1394 terminals 9 and 10 as external terminals, and is connected to the personal computer 2 via the IEEE 1394 serial bus 8 to be connected to the IEEE 1394 terminal 9. And simultaneously, this MD player 3 is connected to the audio amplifier 4 via the IEEE 1394 serial bus 11 as the communication means to be connected to the IEEE 1394 terminal 10.

The audio amplifier 4 comprises an IEEE 1394 terminal 12 as an external terminal, an input external terminal for optical cable 13 to transmit optical digital data defined by the international electrotechnical Commission (IEC) 60958, an input external terminal for RCA cable 14 to transmit analog audio signal, an input external terminal 15 for RCA cable to transmit analog audio and video signals, and an output external terminal for RCA cable 16 to transmit analog audio and video signals.

The audio amplifier 4 is connected to the MD player 3 via the IEEE 1394 serial bus 11 to be connected to the IEEE 1394 terminal 12, and it is connected to the CD player 5 via the optical cable 17 as the connecting means to be connected to the input external terminal 13, and is connected to the CD player 5 via the RCA cable 18 as the connecting means to be connected to the input external terminal 14, and is connected to the VTR 6 via the RCA cable 19 as the connecting means to be connected to the input external terminal 15, and is connected to the VTR 6 via the RCA cable 20 as the connecting means to be connected to the output external terminal 16.

The CD player 5 comprises an output external terminal for optical cable 21 to transmit optical digital data and an output external terminal for RCA cable 22 to transmit analog audio signal as external terminals, and as well as being connected to the audio amplifier 4 via the optical cable 17 to be connected to the output external terminal 21, this CD player 5 is connected to the audio amplifier 4 via the RCA cable 18 to be connected to the output external terminal 22.

The VTR 6 comprises an output external terminal for RCA cable 23 to transmit analog audio and video signals and an input external terminal for RCA cable 24 to transmit analog audio and video signals. And as well as being connected to the audio amplifier 4 via the RCA cable 19 to be connected to the output external terminal 23, the VTR 6 is connected to the audio amplifier 4 via the RCA cable 20 to be connected to the input external terminal 24.

At this point, the IEEE 1394 bus interface that connects the personal computer 2, the MD player 3 and the audio amplifier 4 each other will be described in the following paragraphs.

Figure 2:
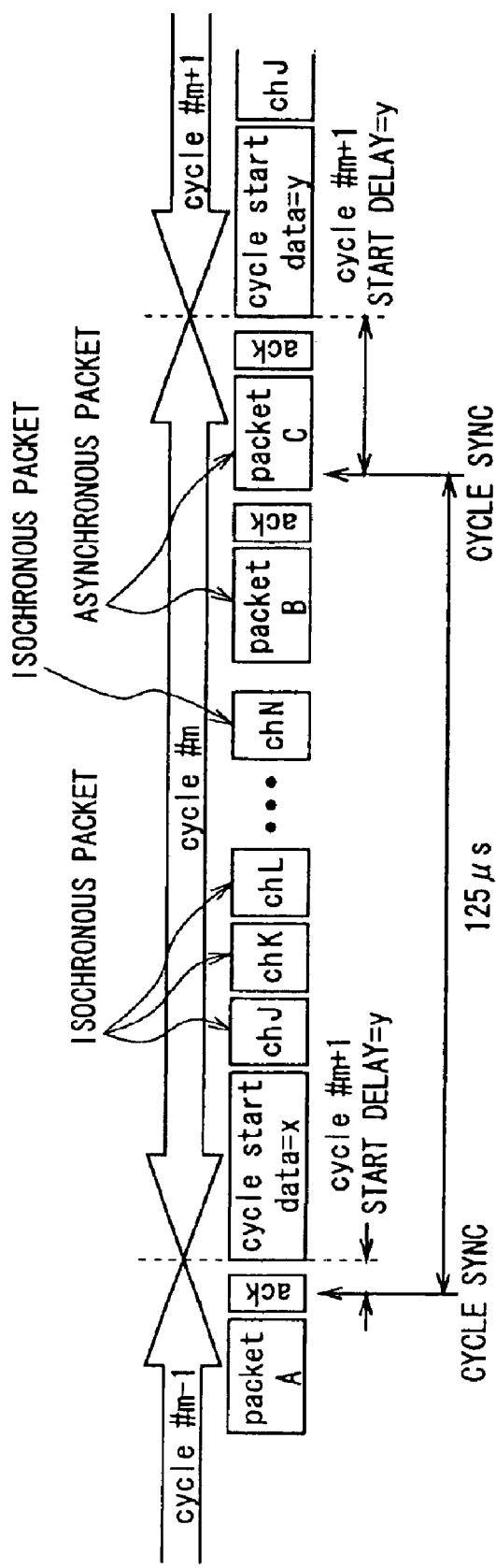
FIG. 2 is a diagram showing a cycle structure of data transmission.

FIG. 2 shows the cycle structure of data transmission of the device connected by the IEEE 1394. In the IEEE 1394, data is divided into packets and transmitted in time division based on the cycle with the length of 125 $\mu$S. This cycle is formed by the cycle start signal to be supplied from the node (either one of devices connected to the bus) having the cycle master operation. Isochronous packet secures the band required for transmission from the head of all cycles (this is called as band even though this is time unit). Accordingly, in the isochronous transmission, the data transmission within the fixed time is guaranteed. However, if the transmission error occurs, data is lost because there is no protecting system. In the asynchronous transmission in which the node secured bus as a result of arbitration transmits asynchronous packet during the time when each cycle is not used for isochronus transmission, the positive transmission would be guaranteed by using the acknowledge and retry. However, the transmission timing would not become constant.

In order to conduct the isochronous transmission the predetermined node must correspond to the isochronous operation. Moreover, at least one of nodes that corresponding to the isochronous operation must have the cycle master function. Furthermore, at least one of nodes connected to the IEEE 1394 series bus 8 to 11 (i.e., personal computer 2, MD player 3 and audio amplifier) should have the isochronouse resource manager function.

Figure 3:
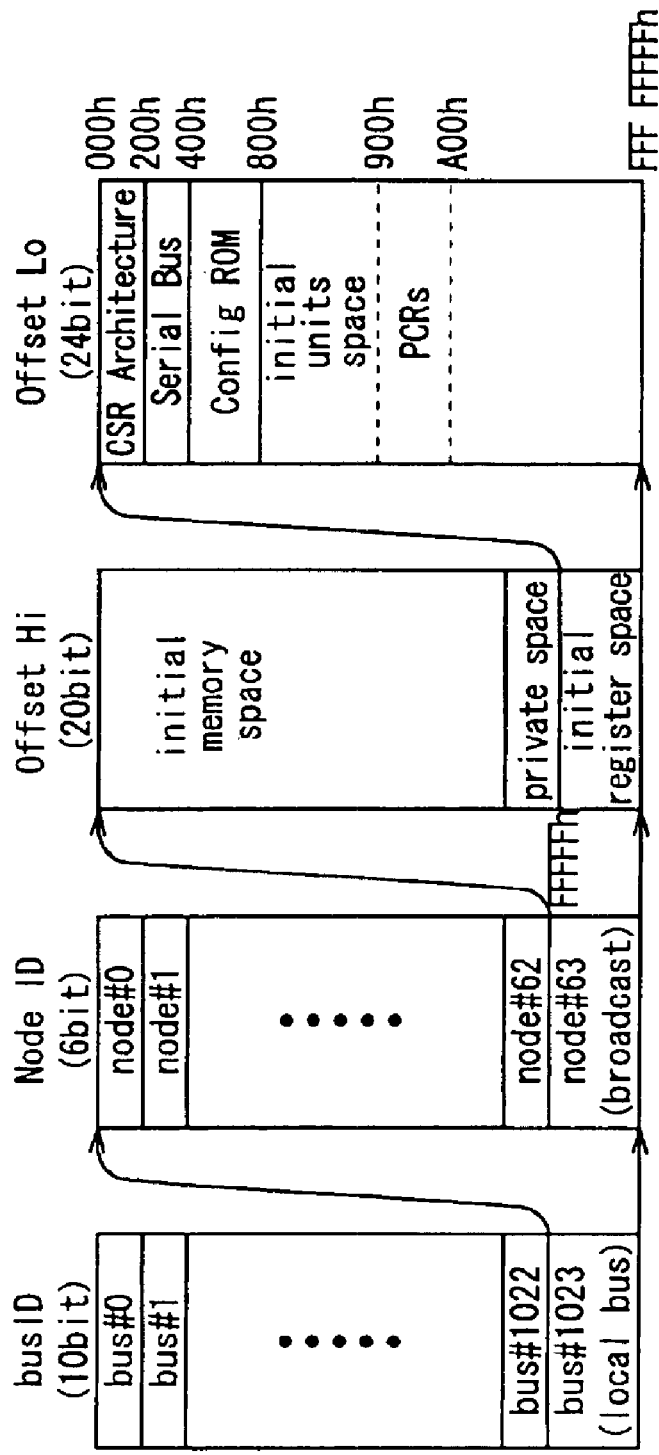
FIG. 3 is a diagram showing a structure of address space in the CSR architecture.

The IEEE 1394 is compliant with the control & status register (CSR) architecture having 64-bit address space defined by the ISO/IEC 13213. FIG. 3 explains the structure of address space of the CSR architecture. The higher level 16 bits are node ID to show the node on each IEEE 1394 and the remaining 48 bits are used to specify the address space given to each node. The higher level 16 bits are further divided into 10-bit of bus ID and 6-bit of physical ID (node ID of narrow sense). Since the value that all bits become 1 is used for specific purpose, 1023 buses and 63 nodes can be specified.

The space to be defined by the higher level 20 bits in the address of 256 terabyte to be defined by the lower level 48 bits are divided into the initial register space, private space and initial memory space to be used for 2048-byte CSR specific register and IEEE 1394 specific register. The space defined by the lower level 28 bits, if the space defined by the upper level 20 bits is the initial register space, these are used as the configuration read only memory (ROM), the initial unit space to be used for the node specific usage, and the plug control register (PCRs).

FIG. 4 shows main CSR offset addresses, names and functions. The offset of FIG. 4 shows offset addresses from FFFFF0000000h (the number attached with h at the end shows hexadecimal notation) at which initial register space starts. The bandwidth available register having the offset 220h shows the bandwidth available to isochronous communications, and only the value of node operating as the isochronous resource manager is regarded as effective. More specifically, each node has the CSR of FIG. 3, however, regarding the bandwidth available register, only the one for the isochronous manager is regarded effective. That is, in practice only the isochronous resource manager has the bandwidth available register. The maximum value is kept in the bandwidth available register when no bandwidth is allocated to the isochronous communications and the value decreases gradually in each time the bandwidth is allocated.

Each bit of the offset 224h to 228h of the channel available register corresponds respectively to the channel numbers 0 to 63. And when bit is 0, this means that the channel has been already allocated. Only channel available register of the node operating as the isochronous resource manager is effective.

Figure 5:
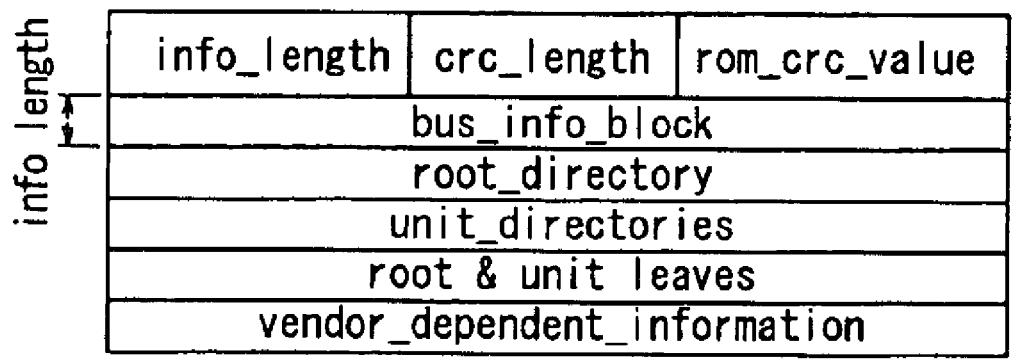
FIG. 5 is a diagram explaining a general ROM format.

Returning to FIG. 3, configuration ROM based on the general read only memory (ROM) format is placed in the address 200h to 400h in the initial register space. FIG. 5 is a diagram showing the general ROM format. The node that is the access unit on the IEEE 1394 and can have multiple units to operate independently in utilizing the address space commonly in the node. The unit directories can show the software version and position to this unit. The positions of bus info block and root directory are fixed, however, positions of other blocks are specified by the offset address.

FIG. 6 is a diagram showing the bus info block, root directory and the unit directory in detail. In Company ID in the Bus info block, the ID number showing the manufacturer of the device, only one ID in the world, is stored. In Chip ID, the ID unique to that device is memorized. Moreover, according to the IEC 61833 standard, in the unit spec ID of the unit directory of the device that satisfies the IEC 61883, 00h is written in the first octet, Aoh is written in the second octet and 2Dh is written in the third octet. Moreover, 01h is written in the first octet of the unit switch version (unit sw version), and 1 is written in the LSB (Least Significant Bit) of the third octet.

In order to control input/output of the device via the interface the node has the PCR (Plug Control Register) defined by the IEC 61883 in the address 900h to 9FFh in the initial unit space of FIG. 3. And logically the concept of plug is materialized in order to form the signal path similar to the analog interface. FIG. 7 is a diagram explaining the structure of PCR. The PCR has output plug control register (oPCR) showing the output plug and input plug control register (iPCR) showing the input plug. Moreover, the PCR has output master plug register (oMPR) and input master plug register (iMPR) to show information of output plug or input plug that is unique to each device. Each device never has multiple oMPRs and iMPRs respectively. However, it is possible to have multiple oPCRs and iPCRs corresponding to each plug according to the capability of the device. The PCR shown in FIG. 7 has 31 oPCRs and iPCRs respectively. The flow of isochronous data can be controlled by operating the register corresponding to these plugs.

FIGS. 8A to 8D show diagrams of the structures of oMPR, oPCR, iMPR and iPCR. FIG. 8A shows the structure of oMPR, FIG. 8B shows the structure of oPCR, FIG. 8C shows the structure of iMPR and FIG. 8D shows the structure of iPCR respectively. In the data rate capability of 2 bits of the MSB side of oMPR and iMPR, code showing the maximum transmission speed of isochronous data that the device can transmit or receive is stored. The broadcast channel base of oMPR defines the channel number that is used for broadcast output.

In the number of output plugs of 5 bits of the LSB side of oMPR, the number of output plugs that the device has, that is the value showing the number of oPCR is stored. In the number of input plugs of 5 bits of the LSB side of iMPR, the number of input plugs that the device has, i.e., the value showing the number of iPCR is stored. The non-persistent extension field and the persistent extension field are fields defined for future extensions.

On-lines of MSB of oPCR and iPCR show the usage condition of plugs. More specifically, if its value is 1, this shows that plug is ON-LINE and if the value is 0, this shows that plug is OFF-LINE. The value of broadcast connection counter of oPCR and iPCR shows the existence of broadcast connection (1) or non-existence of broadcast connection (0). The value possessed by the point-to-point connection counter having the width of 6-bit of oPCR and iPCR shows the number of point-to-point connections that the plug has.

The value that the channel number having the 6-bit width of oPCR and iPCR has shows the isochronous channel number to which that plug is connected. The value of data rate having 2-bit width of oPCR shows the actual transmission speed of isochronus data packet to be put out from that plug. The code to be stored in the overhead ID having the 4-bit width of oPCR shows the over band width of isochronous communications. The value of pay load having the 10-bit width of oPCR shows the maximum value of data contained in the isochronous packet that the plug can deal with.

Figure 9:
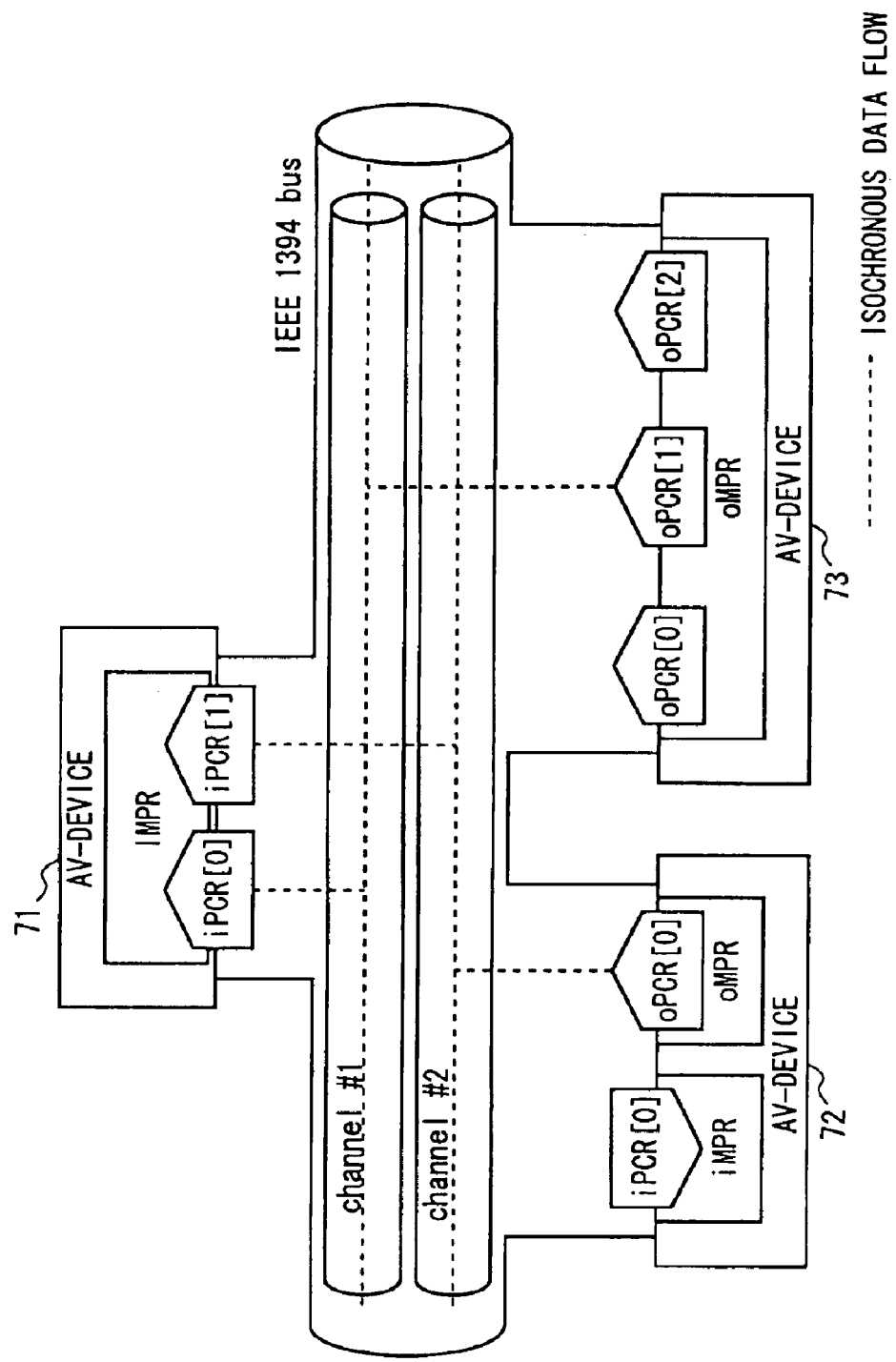
FIG. 9 is a diagram showing the relationship among a plug, plug control register, and an isochronous channel.

FIG. 9 is a diagram showing the relation between plug, plug control register and isochronous channel. AV devices 71 to 73 are connected by the IEEE 1394 serial bus. In oPCR[0] to oPCR[2] in which the transmission speed and the number of oPCRs are regulated by oMPR of the AV device 73, the isochronous data of which channel is designated by the oPCR[1] is transmitted to the channel #1 of the IEEE 1394 serial bus. In iPCR[0] and iPCR[1] in which the transmission speed and the number of iPCRs are regulated by iMPR of the AV device 71, the AV device 71 reads in the isochronous data transmitted to the channel #1 of the IEEE 1394 serial bus. Similarly, the AV device 72 outputs the isochronous data to the channel #2 designated by the oPCR, and the AV device 71 reads in the isochronous data from the channel #2 designated by iPCR[1].

With this arrangement, data transmission is conducted between devices connected by the IEEE 1394 serial bus. However, in the system of the present embodiment, the control and the condition judgment of each device can be conducted in utilizing the AV/C command set regulated as the command to control devices connected via the IEEE 1394 serial bus. Next, this AV/C command set will be explained.

Figure 10:
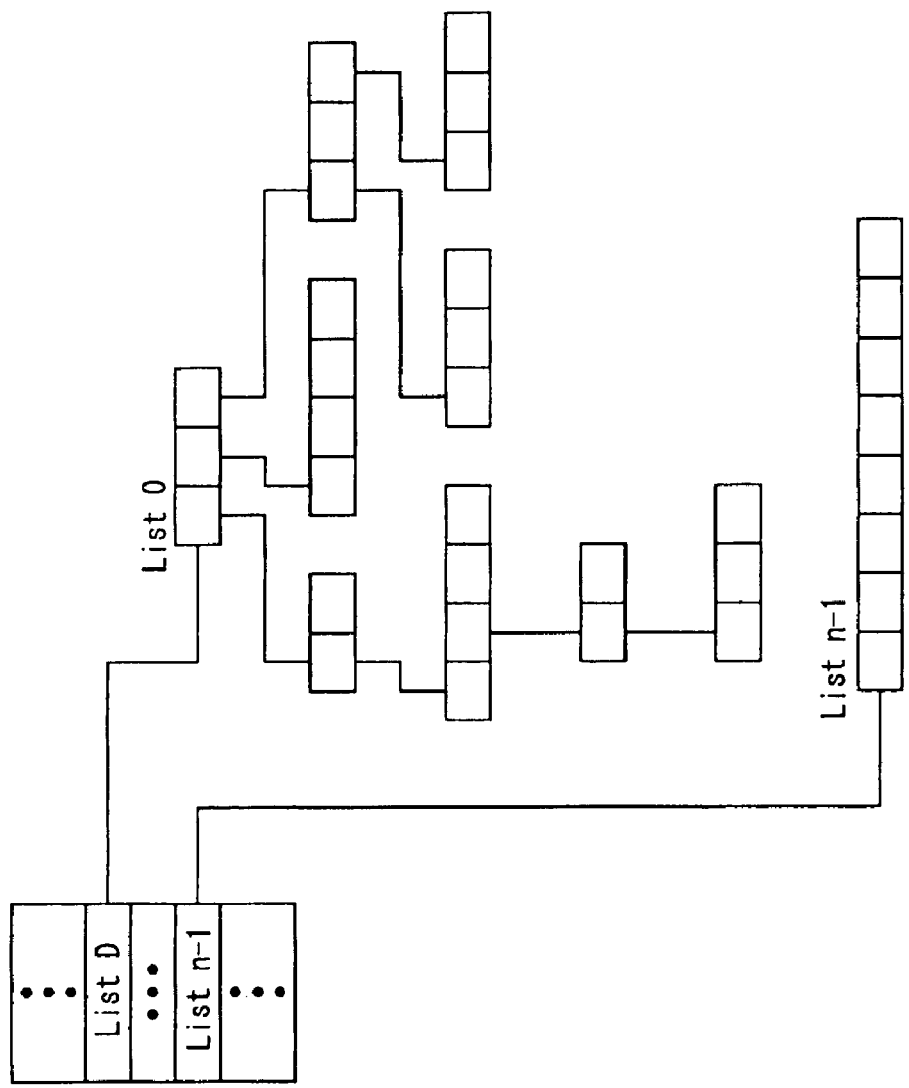
FIG. 10 is a diagram showing the data structure of the Subunit Identifier Descriptor.

Firstly, the data construction of the sub-unit identifier descriptor in the AV/C command set to be used in the system of the present embodiment will be described referring to FIG. 10–FIG. 13 in the following paragraphs. FIG. 10 shows the data construction of the Subunit Identifier Descriptor. As shown in FIG. 10, data is formed of lists of hierarchical construction of Subunit Identifier Descriptor. The list shows for example, if it is a tuner, channels that can be received, and if it is a disk, it shows such as musics recorded on that disk. The list of the highest level layer of the hierarchical construction is referred to as route list, and the list 0 becomes the route to the list of the lower level. The route lists exist by the number of objects. Similarly, lists 2 to (n−1) become the route list. At this point, if the AV device is a tuner, for example, an object means each channel in the digital broadcasting. Moreover, all lists of one hierarchy hold the information in common.

FIG. 11 shows the format of the General Subunit Identifier Descriptor to be used in the existing system. The generic information on functions is described in the contents of the descriptor. However, the value of descriptor length field itself is not included. The generation ID shows the version of AV/C command set and its value is currently "00h" (h shows hexadecimal notation) as shown in FIG. 12. At this point "00h" means that the data construction and the command are the version 3.0 of the AV/C General Specification. Moreover, as shown in FIG. 12, all values except "00h" are reserved for the future specifications.

Size of list ID shows the number of bytes of the list ID. Size of object ID shows the number of bytes of the object ID. Size of object position shows the position (the number of bytes) in the list to be used when referring in the case of controlling. Number of root object lists shows the number of root object lists. Root object list ID shows ID to identify the root object lists of the highest level of the independent hierarchies respectively.

Subunit dependent length shows the number of bytes of the succeeding subunit dependent information field. Subunit dependent information is the field to show unique information to the function. Manufacturer dependent length shows the number of bytes of the succeeding manufacturer dependent information field. Manufacturer dependent information is the field to show the specification information of the vender (maker). In this connection, if the manufacturer dependent information does not exist in the descriptor, this field does not exist.

FIG. 13 shows the assignment ranges of the list ID shown in FIG. 11. As shown in FIG. 13, "0000h to 0FFFh" and "4000h to FFFFh" are reserved as the assignment ranges for future specifications. "1000h to 3FFFh" and "10000h to max list ID value are prepared to identify the subunit-type dependent information.

Figure 14:
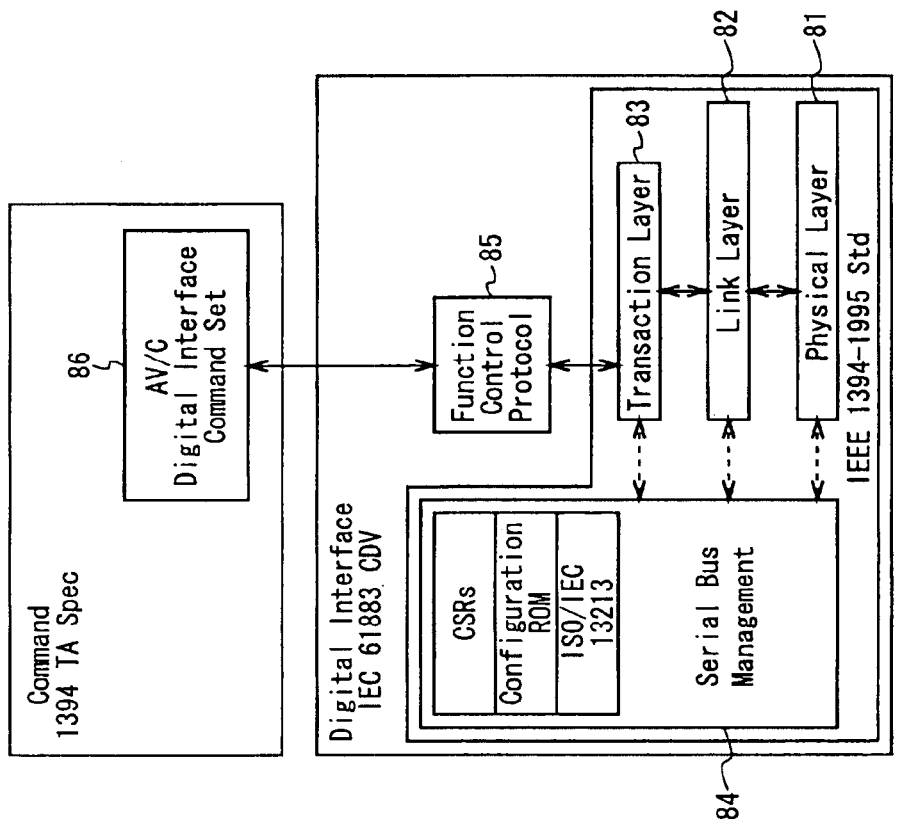
FIG. 14 is a diagram showing a stack model for the AV/C command set.

Next, the AV/C command set to be used in the system of the present embodiment will be explained referring to FIG. 14~FIG. 19. FIG. 14 shows the stack model of the AV/C command set. As shown in FIG. 14 the physical layer 81, the link layer 82, the transaction layer 83 and the serial bus management 84 are compliant with the IEEE 1394. The function control protocol (FCP) 85 is compliant with the IEC 61883. The AV/C command set 86 conforms to the 1394TA spec.

Figure 15:
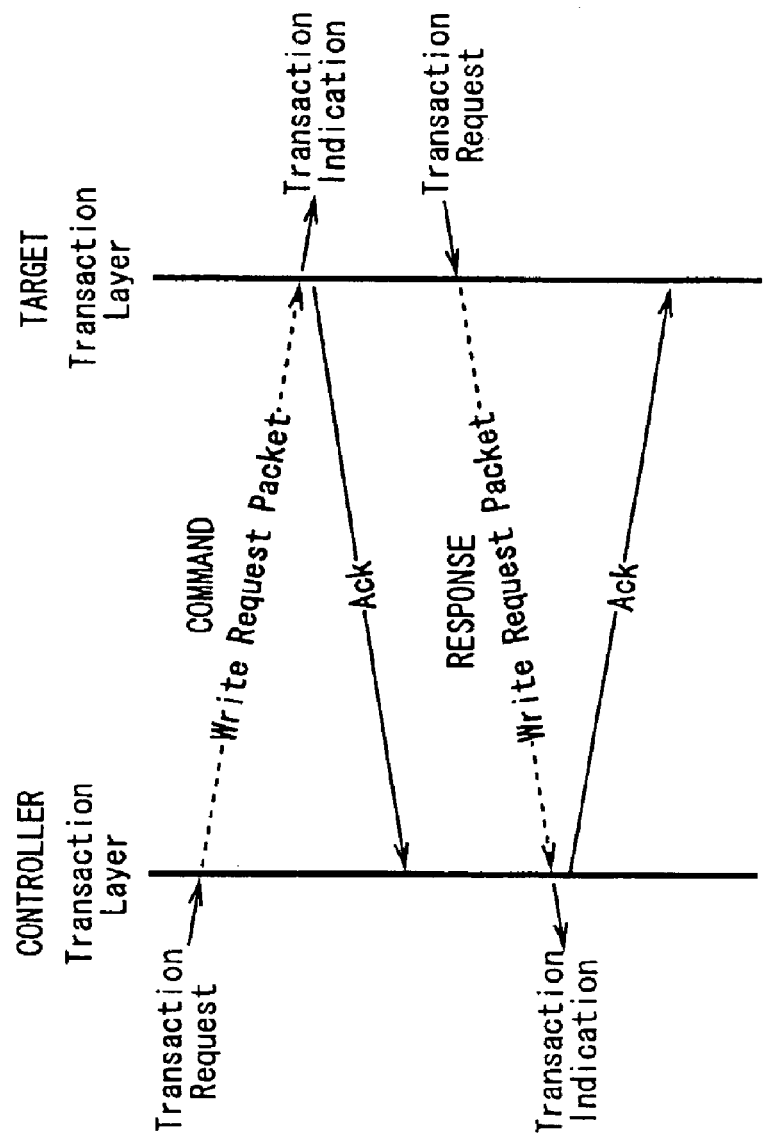
FIG. 15 is a diagram explaining a command and a response in the FCP85.
Figure 16:
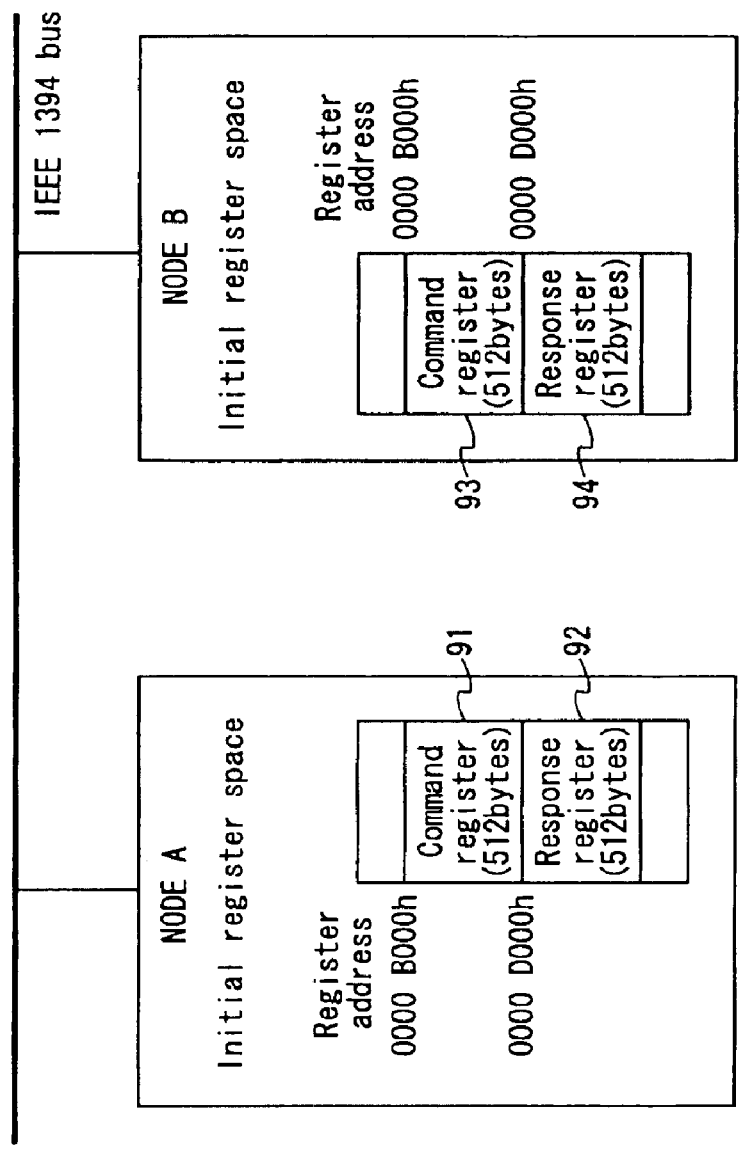
FIG. 16 is a diagram explaining a command and a response in the FCP more detail.

FIG. 15 is a diagram showing the command and response of the FCP85 of FIG. 16. The FCP is the protocol to control the AV device on the IEEE 1394. As shown in FIG. 15, the controlling side is the controller and the side to be controlled is the target. The transmission or response of the command of the FCP is conducted between nodes by using the write transaction of the asynchronous communication of the IEEE 1394. The target received the data returns an acknowledgement to the controller for confirming the receipt of signal.

FIG. 16 is a diagram for explaining further the relation between the command and response of the FCP shown in FIG. 15 in detail. The node A is connected with the node B via the IEEE 1394. The node A is the controller and the node B is the target. The command register and the response register of 512 bytes each are prepared both in node A and node B. As shown in FIG. 16, the controller conveys the command by writing the command message in the command register 93. Contrary to this, the target conveys the answer by writing the response message in the response register 92 of the controller. Control information is exchanged onto said two messages. Types of command messages to be transmitted by the FCP will be described on the CTS in the data field of FIG. 17 to be described later.

Figure 17:
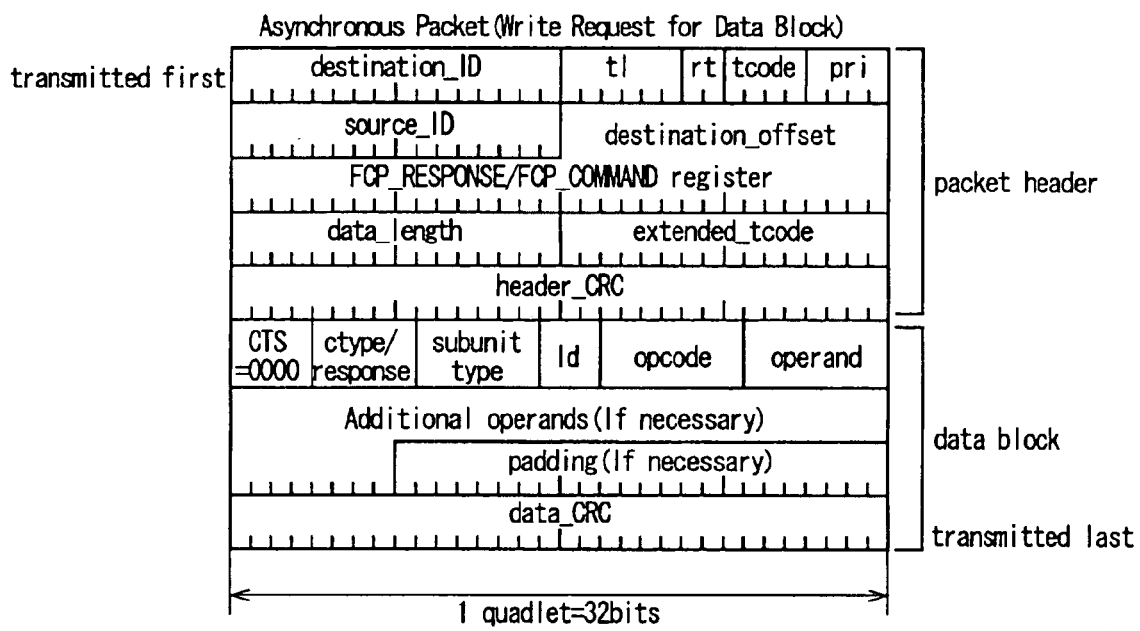
FIG. 17 is a diagram showing the data structure of a packet to be transmitted in an asynchronous transmission mode.

FIG. 17 shows the data construction of packet to be transmitted at the asynchronous transmission mode of the AV/C command. The AV/C command set is a command set to control the AV device, and CTS (ID of the command set)="10000". AV/C command frames and response frames are transmitted between nodes by using said FCP. In order not to become a burden to the bus and the AV device, the response to the command is to be conducted within 100 ms. As shown in FIG. 17, the data of asynchronous packets is formed in 32 bits horizontal direction (=1 quadlet). The upper stage in Figure shows the packet header part and the lower stage shows the data block. The destination-ID shows the addressee.

CTS shows ID of the command set. In the AV/C command set, CTS="0000". The ctype/response field shows the function classification of the command when the packet is command. And when the packet is response, it shows the processing result of the command. The command is roughly classified into four(4) types: i.e., (1) the command to control the function from outside (CONTROL), (2) the command to inquire the condition from outside (STATUS), (3) the command to inquire the existence or non-existence of support of the control command from outside (GENERAL INQUIRY (existence or non-existence of support of opcode) and SPECIFIC INQUIRY (existence or non-existence of support of opcode and operands)), and (4) the command to request to notify the change of condition (NOTIFY).

The response is returned according to the command type. Regarding the response to the CONTROL command, there are NOT IMPLEMENTED, ACCEPTED, REJECTED and INTERIM. Regarding the response to the STATUS command, there are NOT IMPLEMENTED, REJECTED, IN TRANSITION and STABLE. Regarding the response to the GENERAL INQUIRY and SPECIFIC INQUIRY commands, there are IMPLEMENTED and NOT IMPLEMENTED. Regarding the response to the NOTIFY command, there are NOT IMPLEMENTED, REJECTED, INTERIM and CHANGED.

Subunit type is provided to specify the function in the device, such as the tape recorder/player and tuner is assigned. In order to identify when multiple subunits of the same type exist, addressing is conducted by the subunit ID as the ID number. Opcode shows the command and operand shows the parameter of the command. Additional operands are fields to be added if necessary. Also, padding is the field to be added as occasion demands. Data cyclic redundancy check (CRC) is used for the error check when transmitting data.

FIGS. 18A to 18C show detailed examples of the AV/C command. FIG. 18A shows a detailed example of ctype/response. The upper stage in Figure shows Command, and the lower stage in Figure shows Response. CONTROL is assigned to "0000", STATUS is assigned to "0001", SPECIFIC INQUIRY to "0010", NOTIFY to "0011", and GENERAL INQUIRY is assigned to "0100". "0101 to 0111" are reserved for future specification. Moreover, NOT IMPLEMENTED is assigned to "1000", ACCEPTED to "1001", REJECTED to "1010", IN TRANSITION to "1011", IMPLEMENTED/STABLE to "1100", CHANGED to "1101", and INTERIM is assigned to "1111". "1110" is reserved for the future specification.

FIG. 18B shows a detailed example of SUBUNIT TYPE. Video Monitor is assigned to "00000", Disk Recorder/Player is assigned to "00011", Tape Recorder/Player is assigned to "00100", Tuner is to "00101", Video Camera is to "00111", Vendor Unique is to "11100", Subunit type extended to next byte is assigned to "11110". Incidentally, Unit is assigned to "11111", however, it is used when sending to the device and such as ON/OFF of the power source can be listed.

FIG. 18C shows a detailed example of Opcode. Opcode table exists in each subunit type, and here it shows the opcode at the time when the subunit type is Tape recorder/player. Moreover, operand is defined per the opcode. Here, VENDOR-DEPENDENT is assigned to "00h", SEARCH MODE to "50h", TIMECODE to "51h", ATN to "52h", OPEN MIC to "60h", READ MIC to "61h", WRITE MIC to "62h", LOAD MEDIUM is assigned to "C1h", RECORD is assigned to "C2h", PLLAY is assigned to "C3h" and WIND is assigned to "C4h".

FIGS. 19A and 19B show detailed examples of the AV/C command and response. In the case of conducting the play instruction to the reproduction device as the target (consumer), the controller sends out the command as shown in FIG. 19A. Since this command uses the AV/C command set, CTS="0000". Because the command (CONTROL) to control the device from outside is used in ctype, ctype= "0000" (refer to FIG. 18A). Since subunit type is Tape Recorder/Player, subunit type="00100" (refer to FIG. 18B). Id shows when ID0, and id=000. Opcode becomes "C3h" that means PLAY (refer to FIG. 18C). Operand becomes "75h" meaning FORWARD. And when it is reproduced, the target returns the response as shown in FIG. 19B to the controller. At this point, Accepted is entered into Response, response="1001" (refer to 18A). All others except Response are the same as FIG. 19A, the explanation will be omitted.

Figure 20:
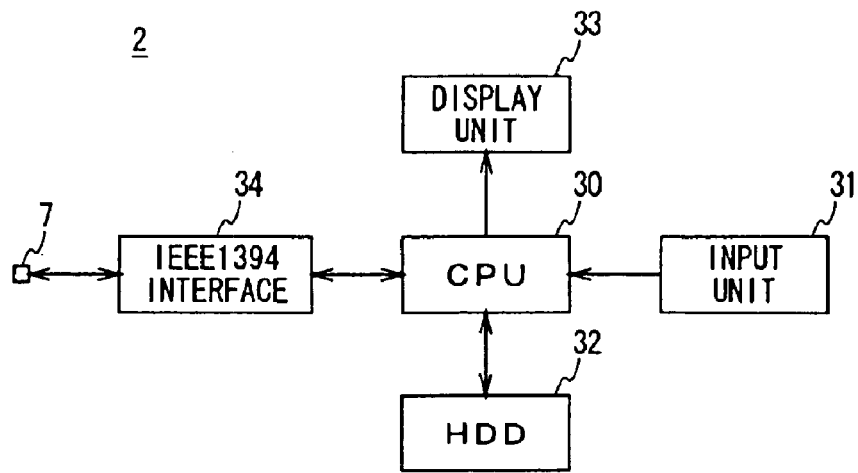
FIG. 20 is a block diagram showing the construction of a personal computer.

Next, the construction of the personal computer 2 is shown in FIG. 20. The central processing unit (CPU) 30 is a circuit to control the personal computer 2 as a whole. When the user operation information is entered from an input unit 31 having the keyboard and the mouse, the CPU reads out the software program from a hard disc drive (HDD) 32 based on said operation information, and controls the function of each circuit by executing the software program read out.

More specifically, the CPU 30 forms display screen data based on the operation information of the user, and sending this out to the display unit 33, it displays the data on said display unit 33. Moreover, the CPU 30 forms control data to control the switching operation of external terminals in the audio amplifier 4 based on the operation information of the user, and transmits this to the audio amplifier 4 through the IEEE 1394 interface 34, the IEEE 1394 serial bus 8, the MD player 3 and the IEEE 1394 serial bus 11 successively. On the other hand, when the response data to said control data is supplied from the audio amplifier 4 successively through the IEEE 1394 serial bus 11, MD player 3, IEEE 1394 serial bus 8 and the IEEE 1394 interface 14, the CPU 30 controls the function of each circuit based on said response data supplied. In this connection, the AV/C command set is used to transmit said control data and the response data for example.

Figure 21:
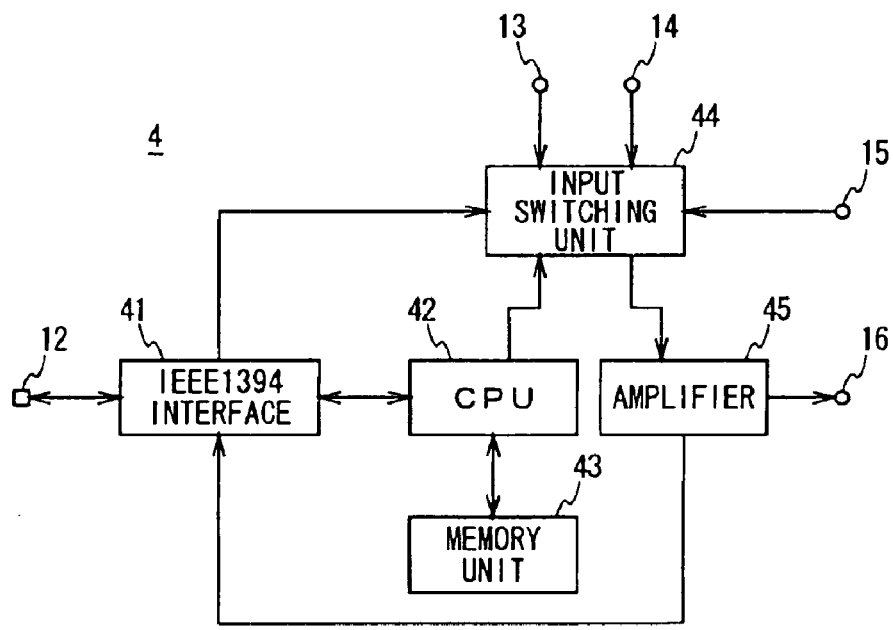
FIG. 21 is a block diagram showing the construction of an audio amplifier.

More specifically, as shown in FIG. 21, the audio amplifier 4 notifies the control data to be supplied via the MD player 3 from the personal computer 2 to the CPU 42. And said CPU 42 controls the function of each circuit unit based on this control data.

In the audio amplifier 4, the unique identification numbers are assigned to the IEEE 1394 terminal 12 and each input external terminals 13 to 15. And "CD DIGITAL" is assigned to the input external terminal 13 for optical cable, "CD" is assigned to the input external terminal 14 for RCA cable to transmit analog audio signal, and the name of "VIDEO" is attached to the input external terminal 15 for RCA cable to input analog audio and video signals, and the name data related to the names of input external terminals 13 to 15 except the IEEE 1394 terminal are memorized in the memory unit 43 in advance. Moreover, these name data may be memorized on the memory space shown in FIG. 3. Or these may be memorized in the list of hierarchical construction as described in the subunit identifier descriptor of FIG. 10.

The CPU 42 reads out the name data from the memory unit 43 in response to the request from the personal computer 2 and transmits said name data read out to the personal computer 2 via the IEEE 1394 interface 41 and the MD player 3.

Then, the CPU 42 forms an input switching signal responding to the request from the personal computer 2 and transmitting said input switching signal, selects the desired input external terminal from among the IEEE 1394 terminal 12 and input external terminals 13 to 15 and switches the input, and transmits the input data to be entered from said selected input external terminal to the amplifier 45.

The amplifier 45 forms an output data by applying the equalizer processing to amplify the signal level of the predetermined band to the input data to be supplied from the input switching unit 44, and outputting this to the MD player 3 via the IEEE 1394 interface 41 and the IEEE 1394 terminal 12, outputs this to the VTR 6 via the output external terminal 45.

Figure 22:
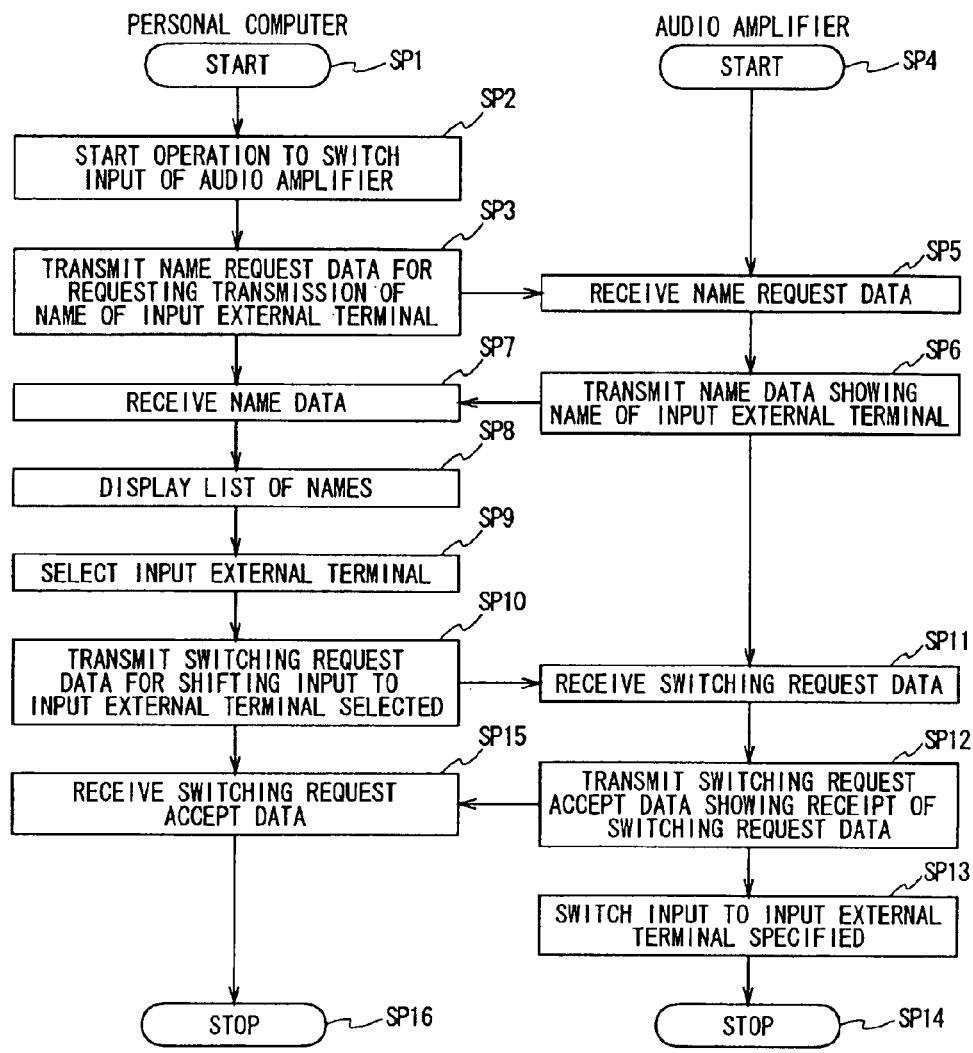
FIG. 22 is a flow chart showing the input external terminal switching processing procedure.

At this point, the input external terminal switching processing procedure for switching the input external terminal of the audio amplifier 4 will be explained. In FIG. 22, when the CPU 30 of the personal computer 2 judges that the user has started the operation to switch the input of the audio amplifier 4 via the input 31 at the step SP2 entered from the step SP1, moves to the following step SP3 and forms the name request data for requesting to transmit names of input external terminals 13 to 15 possessed by the audio amplifier 4 to said personal computer 2 and outputs this to the audio amplifier.

Then, at the step SP5, entering from the step SP4, when the CPU 42 of the audio amplifier 4 receives the name request data transmitted from the personal computer 2 via the MD player 3, moves to the following step SP6. Then, operating the name data as the transmission means, the CPU 42 reads out the name data memorized in the memory unit 43 and transmits this to the personal computer 2 via the MD player 3.

Figure 23:
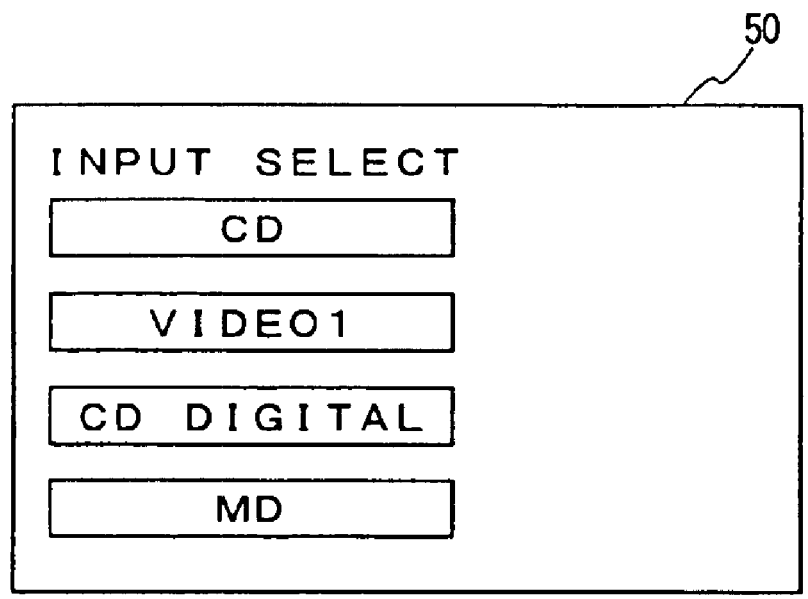
FIG. 23 is a schematic diagram showing the external terminal switching screen.

At the step SP7, when the CPU 30 of the personal computer 2 obtains the name of the IEEE 1394 terminal 12 via the IEEE 1394 serial bus 8 and 11 (after receiving the name data transmitted from the audio amplifier 4 via the MD player 3), moves to the step SP8. And as shown in FIG. 23 it functions as the display control means and displays the name list of input external terminal that the audio amplifier 4 has on the display unit 33 as the output terminal switching screen 50.

At the step SP9, the CPU 30 functions as the selection means, and when it judges that the user selects the desired terminal from input external terminals displayed on the external terminal switching screen such as by moving the mouse cursor, moves to the following step SP10 and functions as the selected terminal identification number data transmission means. And the CPU 30 forms the switching request data for switching the input to the input external terminal having the name selected (i.e., selected terminal identification number data), and transmits this to the audio amplifier 4 via the MD player 3.

At the step SP11, the CPU 42 of the audio amplifier 4 functions as the selected terminal identification number data receiving means. And when the CPU 42 receives the switching request data transmitted from the personal computer 2 via the MD player 3, it moves to the following step SP12 and forms the switching request accept data showing the receipt of said switching request data and transmits this to the personal computer 2 via the MD player 3.

At the step SP13, the CPU 42 of the audio amplifier 4 functions as the switching control means. And the CPU 42 forms an input switching signal based on the switching request data transmitted from the personal computer 2, and by transmitting this to the input switching unit 44, the CPU 42 of the audio amplifier 4 terminates said processing procedure at the step SP14.

On the other hand, at the step SP15, the CPU 30 of the personal computer 2, after receiving the switching request accept data transmitted from the audio amplifier 4 via the MD player 3, moves to the step SP16 and terminates said processing procedure.

Thus, in the AV system 1, when transmitting and recording the audio data MD formed of optical digital data to be reproduced from the CD player 5, the recording operation is executed by selecting "CD DIGITAL" from among input external terminals displayed on the display screen 50 in FIG. 23 and by switching the input of the audio amplifier 4.

According to the foregoing construction, the audio amplifier 4 possesses the IEEE 1394 terminal 12 and input external terminals 13 to 15 excluding said IEEE 1394 terminal 12 as the input external terminals, and the name data showing the names of input external terminals 13 to 15 except said IEEE 1394 terminal 12 are memorized in the memory unit 43 in advance.

Under this condition, the CPU 42 of the audio amplifier 4, informing the name data memorized in the memory unit 43 to the personal computer 2 responding to the request of the personal computer 2, displays the names of input external terminals 12 to 15 possessed by said audio amplifier on the display unit 33 of the personal computer 2.

Thus, the user can easily grasp input external terminals of the audio amplifier 4 just by observing the list of input external terminals displayed on the display unit 33 of the personal computer 2. And thus, the user, by selecting the desired input external terminal from the list of said input external terminals, can switch the input of the audio amplifier 4 easily.

According to the foregoing construction, by informing the names of input external terminals 13 to 15 possessed by the audio amplifier 4 to the personal computer 2 and displaying the names of the IEEE 1394 terminal 12 and input external terminals 13 to 15 excluding said IEEE 1394 terminal 12 on the display unit 33, the user can easily grasp the input external terminals of the audio amplifier 4. And thus, the user can conduct the input switching of said audio amplifier 4 easily.

The embodiment described above has dealt with the case of memorizing the names attached to input external terminals 13 to 15 respectively in the memory unit 43 as the name data. However, the present invention is not only limited to this but also the name of input external terminal may be changed to the name of AV device connected to sad input external terminal such as "VHS", "8 mm", and memorized in the memory unit 43 by the user operating the input unit 31 and the audio amplifier 4 of the personal computer 2. In this case, when the user visually confirms the list of names of input external terminals displayed on the display unit 33 of the personal computer 2, he can recognize the input external terminals of audio amplifier 4 more easily. And furthermore, he can easily recognize the AV devices connected to said input external terminals.

Figure 24A:
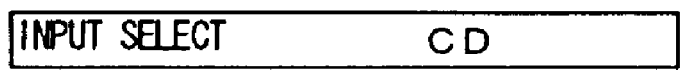
FIGS. 24A to 24C are schematic diagrams showing the external terminal switching screen according to the other embodiment.
Figure 24B:
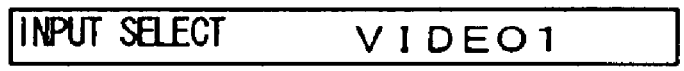
Figure 24C:

Furthermore, the embodiment described above has dealt with the case of displaying the list of input external terminals that the audio amplifier 4 has on the display unit 33 of the personal computer 2 as the external terminal switching screen 50 as shown in FIG. 23. However, the present invention is not only limited to this but also by displaying at least one of names of input external terminals 13 to 15 other than the IEEE 1394 terminal 12, and the user operating the input unit 31 of the personal computer 2, the display of names of input external terminals 13 to 15 may be switched successively. In this case, as the method to select the input external terminal, there is the method to select the input external terminal displayed on the display unit 33 when the user presses an input external terminal switching button provided in the input unit 31, or there is the method to select the input external terminal displayed for the fixed time. FIGS. 24A to 24C are display examples when one name out of input external terminals 13 to 15 is successively shifted and displayed on the display unit 33.

Furthermore, the embodiment described above has dealt with the case of shifting the input external terminals 12~15 of the audio amplifier 4 by the personal computer 2. However, the present invention is not only limited to this but also the output external terminals of the audio amplifier 4 may be shifted.

Furthermore, the embodiment described above has dealt with the case of constructing the AV system 1 adopting the personal computer 2 as the control device, adopting the audio amplifier 4 as the main information processing device, and adopting the MD player 3, CD player 5 and the VTR 6 as the sub information processing devices. However, the present invention is not only limited to this but also the information processing system may be constructed by various other control device, main information processing device and multiple sub information processing devices.

According to the present invention as described above, by transmitting the name data showing the names of multiple terminals possessed by the main information processing device to the control device via the predetermined communication means, and displaying the name of each terminal that said name data shows on the display means of the control device, the user can easily grasp the names of terminals that the main information processing device has.

While there has been described in connection with the preferred embodiments of the invention, it is obvious to those skilled in the art that various changes and modifications may be aimed, therefore, to cover in the appended claims all such changes and modifications as fall within the true spirit and scope of the invention.

What is claimed is:

1. An information processing system comprised of a main information processing device controlled by a control device through a communication means, and sub-information processing devices connected to said main information processing device, said communication means being a serial bus, said main information processing device being an amplifier, and said control device being a computer, wherein:

said main information processing device comprises:
a plurality of terminals for connecting to a plurality of sub-information processing devices with a corresponding plurality of connecting means; at least one of said connecting means being said communication means;
memory means for memorizing name data indicating names of said terminals; wherein said memory means changes the name data indicating the names of said terminals in accordance with a user's input operation; and name data transmission means for transmitting said name data to said control device through the communication means; and said control device comprises:

name data receiving means for receiving said name data which is transmitted from said main information processing device through said communication means; and display control means for displaying the names of said terminals on the display means based on said name data.

2. The information processing system as defined in claim 1, wherein:

said control device comprises:

selecting means for selecting the name of said terminal corresponding to the user's input operation, from among said names of said terminals displayed on said display means; and selected terminal identification number data transmission means for transmitting said terminal selected to said main information processing device as selected terminal identification number data through said communication means; and said main information processing device comprises:

selected terminal identification number data receiving means for receiving said selected terminal identification number data, which is transmitted from said control device through said communication means; and switching control means for switching an input/output of said information processing device to the terminal indicated by said selected terminal identification number data from among said plurality of terminals.

3. An information processing device in an information processing system constructed by connecting the information processing device and a control device through a communication means, said communication means being a serial bus, said information processing device being an amplifier, and said control device being a computer; comprising:

a plurality of terminals for connecting a plurality of sub-information processing devices to the information processing device with a corresponding plurality of connecting means; at least one of said connecting means being said communication means;

memory means for memorizing name data indicating names of said terminals; wherein said memory means changes the name data indicating the names of said terminals in accordance with a user's input operation; and name data transmission means for transmitting said name data to said control device through the communication means.

4. The information processing device as defined in claim 3, comprising:

selected terminal identification number data receiving means for receiving selected terminal identification number data indicating a desired terminal, which is transmitted from said control device through said communication means; and switching control means for switching an input/output of said information processing device to the terminal indicated by said selected terminal identification number data, from among said plurality of terminals.

5. A control device in an information processing system constructed by connecting a main information processing device and the control device through a communication means, said communication means being a serial bus, said main information processing device being an amplifier, and said control device being a computer; comprising:

name data receiving means for receiving name data indicating the names of a plurality of terminals in said main information processing device, which is transmitted from the main information processing device through the communication means; the plurality of terminals for connecting to a plurality of sub-information processing devices with a corresponding plurality of connecting means; at least one of said connecting means being said communication means;

name data changing means for changing the name data indicating the names of said terminals received by said name data receiving means, according to a user's input operation; and display control means for displaying the names of said terminals on a display means based on said name data.

6. The control device as defined in claim 5, comprising:

selecting means for selecting the name of said terminal corresponding to the user's input operation, from among the names of said terminals displayed on said display means; and selected terminal identification number data transmission means for transmitting said selected terminal to said main information processing device as selected terminal identification number data through said communication means.

7. An information processing method in an information processing system comprised of a main information processing device controlled by a control device through a communication means, and a plurality of sub-information processing devices connected to said main information processing device respectively, said communication means being a serial bus, said main information processing device being an amplifier, and said control device being a computer; comprising the steps of:

memorizing name data indicating the names of a plurality of terminals in said main information processing device, which are provided to connect to said plurality of sub-information processing devices with a corresponding plurality of connecting means, in a memory means; at least one of said connecting means being said communication means;

changing the name data indicating the names of said terminals memorized in said memory means, according to a user's input operation;

transmitting said name data to said control device from said main information processing device through the communication means;

receiving said name data, which is transmitted from said main information processing device through the communication means, by said control device; and displaying the names of said terminals on a display means based on said name data.

8. The information processing method as defined in claim 7, comprising the steps of:

selecting the name of said terminal corresponding to the user's input operation, from among the names of said terminals displayed on said display means;

transmitting said terminal selected to said main information processing device from said control means as selected terminal identification number data through the communication means;

receiving said selected terminal identification number data, which is transmitted from said control means through said communication means, by said main information processing device; and switching an input/output of said main information processing device to the terminal indicated by said selected terminal identification number data, from among said plurality of terminals.

9. An information processing method of an information processing system constructed by connecting a main information processing device and a control device through a communication means, said communication means being a serial bus, said main information processing device being an amplifier, and said control device being a computer; comprising the steps of:

memorizing name data indicating the names of a plurality of terminals which are provided in said main information processing device to connect to a plurality of sub-information processing devices via a corresponding plurality of connecting means, in a memory means; at least one of said connecting means being said communication means;

changing the name data indicating the names of said terminals, which is memorized in said memory means, according to a user's input operation; and transmitting said name data to said control device through the communication means.

10. The information processing method as defined in claim 9, comprising the steps of:

receiving selected terminal identification number data indicating the name of a desired terminal, which is transmitted from said control device through said communication means; and switching an input/output of said main information processing device to the terminal indicated by said selected terminal identification number data, from among said plural number of terminals.

11. A control method of an information processing system constructed by connecting a main information processing device and a control device through a communication means, said communication means being a serial bus, said main information processing device being an amplifier, and said control device being a computer; comprising the steps of:

receiving name data indicating the names of a plurality of terminals provided in said main information processing device, which is transmitted from said main information processing device through the communication means; said plurality of terminals being for connecting to a plurality of sub-information processing devices with a corresponding plurality of connecting means; at least one of said connecting means being said communication means;

changing the name data indicating the names of said terminals, which is memorized in a memory means, according to a user's input operation; and displaying the names of said terminals on a display means based on said name data.

12. The control method as defined in claim 11, comprising the steps of:

selecting the name of said terminal corresponding to the user's input operation, from among the names of said terminals displayed on said display means; and transmitting said terminal selected to said main information processing device as selected terminal identification number data from said control device through said communication means.

* * * * *